United States Patent [19]

Kraemer et al.

[11] Patent Number: 5,327,472
[45] Date of Patent: Jul. 5, 1994

[54] BOILING WATER NUCLEAR REACTOR AND NUCLEAR REACTOR FUEL ASSEMBLY FOR THE BOILING WATER REACTOR

[75] Inventors: Wendelin Kraemer, Frankfurt am Main; Walter Uebelhack; Gustav Frömel, both of Erlangen, all of Fed. Rep. of Germany

[73] Assignee: Siemens Aktiengesellschaft, Munich, Fed. Rep. of Germany

[21] Appl. No.: 924,059

[22] PCT Filed: Feb. 20, 1991

[86] PCT No.: PCT/DE91/00133
§ 371 Date: Sep. 29, 1992
§ 102(e) Date: Sep. 29, 1992

[87] PCT Pub. No.: WO91/13442
PCT Pub. Date: Sep. 5, 1991

[30] Foreign Application Priority Data
Feb. 28, 1990 [DE] Fed. Rep. of Germany ....... 4006264

[51] Int. Cl.$^5$ .................................................. G21C 3/39
[52] U.S. Cl. ...................................... 376/439; 376/441
[58] Field of Search .............. 376/443, 439, 438, 441, 376/442; 976/DIG. 60, DIG. 78, DIG. 79

[56] References Cited

U.S. PATENT DOCUMENTS

| 3,395,077 | 7/1968 | Tong et al. | 376/439 |
| 3,787,285 | 1/1974 | Marstrand | 376/439 |
| 3,862,000 | 1/1975 | Pugh et al. | 376/439 |
| 3,886,038 | 5/1975 | Raven | 376/439 |
| 4,224,107 | 9/1980 | Delafosse et al. | 376/462 |
| 4,725,403 | 2/1988 | Buettiker | 376/439 |
| 4,728,480 | 3/1988 | Hatfield | 376/439 |
| 4,749,543 | 6/1988 | Crowther et al. | 376/444 |
| 4,775,510 | 10/1988 | Bryan | 376/443 |
| 4,844,860 | 7/1989 | Hatfield | 376/439 |
| 4,879,090 | 11/1989 | Perrotti et al. | 376/462 |
| 5,112,571 | 5/1992 | Orii et al. | 376/439 |

FOREIGN PATENT DOCUMENTS

0291748 11/1988 European Pat. Off. .

Primary Examiner—Donald P. Walsh
Assistant Examiner—Meena Chelliah
Attorney, Agent, or Firm—Herbert L. Lerner; Laurence A. Greenberg

[57] ABSTRACT

A boiling water reactor includes fuel assemblies having a case containing fuel rods which are parallel to walls of the case. Flow subchannels are formed by each four of the fuel rods. At least two and preferably four vanes in the flow subchannels are tapered in a vertical coolant flow direction and are three-dimensionally curved in such a way as to generate a swirl in the coolant flow. It is therefore possible to obtain a relatively high output from the fuel assembly.

13 Claims, 8 Drawing Sheets

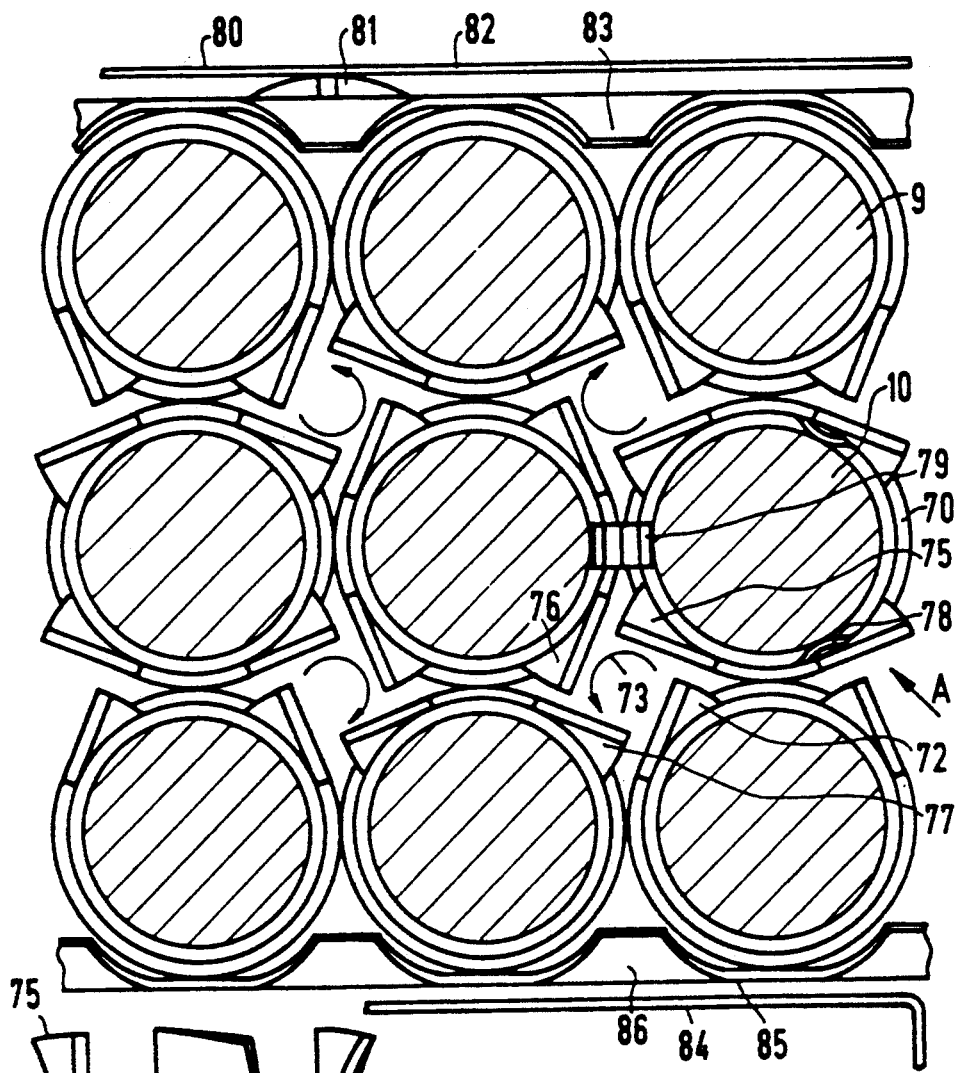
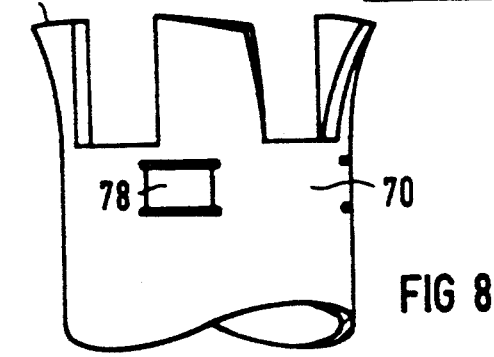
FIG 7
FIG 8

BOILING WATER NUCLEAR REACTOR AND NUCLEAR REACTOR FUEL ASSEMBLY FOR THE BOILING WATER REACTOR

CROSS-REFERENCE TO RELATED APPLICATION

This application is a continuation of International Application PCT/DE91/00133, filed Feb. 20, 1991.

The invention relates to a boiling water reactor, having a pressure vessel, a steam turbine connected to the pressure vessel, at least one nuclear reactor fuel assembly and controllable absorber elements disposed in a reactor core in the pressure vessel, the fuel assembly including an elongated fuel assembly case with mutually parallel side walls laterally closing off the fuel assembly, an inlet end for liquid coolant and an outlet end for a liquid/steam mixture of the coolant, and fuel rods containing nuclear fuel and being disposed side by side and parallel to the case walls, the absorber elements being disposed outside the fuel assembly, the fuel rods being disposed in lengthwise rows and crosswise rows intersecting the lengthwise rows in such a manner that they reach through meshes of a grid extending practically at right angles to the side walls, and each four fuel rods disposed in two adjacent lengthwise rows and two adjacent crosswise rows forming one flow subchannel for the coolant, being parallel to the side walls. The invention also relates to a fuel assembly for the boiling water reactor.

The structures of fuel assemblies for boiling water reactors described above are conventional and are used in the invention as well. They are therefore part of the fuel assembly and the reactor of the invention. In the boiling water reactor core, the liquid coolant enters the fuel assembly case at a lower or inlet end and leaves it as a liquid/steam mixture at an upper or outlet end of the case.

Since an increasing proportion of the coolant, which simultaneously acts as a moderator, is in the form of steam in the upper part of the fuel assembly, the vertical flow in the reactor core must be channelled in such a way that sufficient moderator is present there as well. To this end, tubes for the liquid coolant (water tubes) can be used, which replace one or more fuel rods. Such a water tube may also have a larger cross section than an individual fuel rod, so that it extends over the cross section of a plurality of meshes in the grid, or it may have some other cross section (such as cross-shaped). The case walls also serve to channel the vertical flow and in particular must prevent coolant vapor from accumulating on the absorber elements because of an uncontrolled horizontal flow, which would interfere with the proper course and control of the reactions in the reactor That kind of horizontal flow is even considered desirable for pressurized water reactors, because it brings about a temperature equalization between hotter and cooler regions of the fuel assembly and improves cooling.

Such a horizontal flow, which in a boiling water fuel assembly is largely suppressed by the case walls and in any event is kept away from the absorber elements between the fuel assemblies, can therefore be generated in a pressurized water fuel assembly by suitable baffles or vanes in the flow subchannels. Such vanes may be disposed at the ribs of spacers, which are necessary in any event to fix the mutual spacing of the fuel rods, or on the ribs of their own mixing grids, as is shown, for instance, in FIGS. 1 and 2 of German Published, Non-Prosecuted Application DE-OS 15 64 697. That produces a circular flow around the individual fuel rods by means of which all of the flow subchannels bordering a fuel rod communicate with one another. The superimposition of the individual circular flows then leads to horizontal flows, which pass transversely through the entire fuel assembly. The same circular flows also develop in the grid structures of pressurized water reactors as is shown in FIGS. 1, 8 and 9 of U.S. Pat. No. 4,224,107.

In German Published, Non-Prosecuted Application DE-OS 2 157 742, it is proposed that four vanes be disposed in propeller-like fashion in each flow subchannel of a pressurized away from the coolant flow, tapering and protruding obliquely from the wall of the water tube into the interstices between the adjacent fuel rods. Such baffles deflect the liquid film on the water tube wall and mix it turbulently with the hot liquid/steam mixture of the coolant flowing between the fuel rods.

However, that kind of turbulence increases the pressure loss in the vertical flow and can therefore largely cancel out or even overcome the advantages of improved cooling that are sought.

In contrast, in pressurized water reactors, the creation of a mixture of liquid and steam is prevented by a high pressure in the reactor core, so that even at the hot outlet end of the fuel assembly, there is sufficient liquid moderator available, and dryout of the fuel rods need not be feared. A fuel assembly case, which would merely represent unnecessary consumption of material and addition neutron absorption, is not present, and the absorber elements are distributed as uniformly as possible over the cross section of the fuel assembly.

As a result, completely different flow conditions prevail, In particular, a horizontal flow between adjacent flow subchannels of a fuel assembly and between adjacent fuel assemblies themselves can form. The absorber elements are disposed outside the fuel assemblies, in interstices between the individual fuel assemblies.

Normally, a film of water is located on the surface of the fuel rods, which carries heat produced in the nuclear-heated fuel rods, leads to evaporation of the liquid coolant in the upper part of the fuel assembly, and transfers heat into the interior of the interstices between adjacent fuel rods. The interstices form flow subchannels for the vertical flow in the reactor core. If the output of the fuel assembly is excessive, this water film can tear away or dry out. A boiling transition or dryout of the rods is then said to have occurred. Such an occurrence worsens the heat transfer from the rods to the coolant, and undesirable local overheating of the fuel rods occurs.

On the other hand, in the upper part of the fuel assembly as well, there is still a considerable proportion of the coolant in the form of liquid droplets and a liquid film creeping along the case walls and along a water tube if applicable, which could be utilized to improve cooling in the event of high outputs. U.S. Pat. No. 4,749,543 has therefore proposed that grooves ("flow trippers") be machined on the insides of the case walls, at which grooves a film of liquid is rendered turbulent. According to German Petty Patent DE-G 88 02 565.9, in a boiling water reactor with a central water tube, baffles are attached to the side of a spacer facing water reactor, in order to produce turbulence in the flow subchannels and to produce a greater heat transfer at the fuel rods.

In U.S. Pat. No. 4,725,403, for the same purpose, one additional sheath is mounted on the spacer ribs, which has two vanes on its side facing away from the coolant flow that are inclined toward one another in such a way that a swirl is imposed upon the pressurized water reactor coolant flowing through the additional sheath. According to German Published, Non-Prosecuted Application DE 35 19 421 A1, the additional sheath itself is also wound spirally within itself, and it has four such vanes, which are bent outward in the direction of the desired swirl. However, such vanes of pressurized water reactors represent a considerable flow resistance and therefore cause a pressure drop, worsening the utilization of the reactor, so that the desired improvement practically does not ensue.

Therefore, if such vanes are used at all in pressurized water reactors to produce a horizontal flow, particular care must be taken to ensure that the vertical flow turbulence, which is unavoidable at such vanes, and the attendant pressure loss, are kept as small as possible.

According to Published European Application No. 0 291 748, corresponding to U.S. Pat. No. 4,844,860, an especially low pressure loss arises at the vanes of a gridlike spacer if the vanes at the intersections are bent in pairs toward one another and are welded together in such a way that one pair of diagonally disposed triangles, aimed at the fuel rods, is created in each flow channel. That produces swirling flows which cosine to make horizontal flows extending diagonally through the pressurized water fuel assembly.

In boiling water reactors, if a horizontal flow should develop at all, it is interrupted at the case walls in any event, so that it need not be expected that any substantial improvement would be attainable by using vanes to generate a horizontal flow. Instead, it is precisely in boiling water reactors, that the pressure loss in the flow subchannels is especially critical.

It is accordingly an object of the invention to provide a boiling water nuclear reactor and a nuclear reactor fuel assembly for the boiling water reactor, which overcome the hereinafore-mentioned disadvantages of the heretofore-known devices of this general type and which utilize the liquid portion of the coolant contained in the liquid/steam mixture to increase the output of the fuel assembly and to prevent dryout.

It has surprisingly been found that vanes or similar baffles, which are used in pressurized water reactors to produce and reinforce horizontal flows and are intended to generate as little turbulence as possible in the vertical flow, are so advantageous in boiling water reactors, precisely because of this turbulence, that the disadvantage of the increased pressure loss is acceptable.

Horizontal flows only play a subordinate role, because they are deflected by the case walls and have to be kept away from the absorber elements.

With the foregoing and other objects in view there is provided, in accordance with the invention, a boiling water reactor, comprising a pressure vessel, a steam turbine connected to the pressure vessel, a reactor core disposed in the pressure vessel, at least one nuclear reactor fuel assembly disposed in the reactor core, and controllable absorber elements disposed in the reactor core outside the at least one fuel assembly; the at least one fuel assembly including an elongated fuel assembly case with mutually parallel side walls laterally closing off the fuel assembly, an inlet end for liquid coolant, an outlet end for a liquid/steam mixture of the coolant, fuel rods containing nuclear fuel being disposed side by side and parallel to the side walls of the case, and a grid extending practically or substantially perpendicularly to the side walls of the case, the grid having grid meshes formed therein through which the fuel rods extend; the fuel rods being disposed in lengthwise rows and in crosswise rows intersecting the lengthwise rows, and each four of the fuel rods disposed in two adjacent lengthwise rows and in two adjacent crosswise rows forming one flow subchannel being parallel to the side walls of the case for coolant flowing in a given direction, the flow subchannels defining a center axis and side walls of the flow subchannels; and at least two vanes disposed in each of at least a plurality of the flow subchannels, the vanes being tapered in the given direction, being three-dimensionally curved or at least bent to form an angle with respect to the center axis, for creating a swirl in the coolant around the center axis.

In accordance with another feature of the invention, the at least two vanes are four vanes disposed in each of the plurality of flow subchannels, the four vanes being substantially or practically rotationally symmetrical about the center axis.

In accordance with a further feature of the invention, the grid is formed of ribs having edges facing away from the coolant flow, and the vanes are disposed on the edges of the ribs.

In accordance with an added feature of the invention, the ribs have retaining elements fixing a spacing between the fuel rods and the side walls of the case.

In accordance with an additional feature of the invention, all of the vanes are disposed and formed substantially rotationally symmetrically in one direction about the center axis in one of the flow subchannels, and all of the vanes are disposed and formed substantially rotationally symmetrically in an opposite direction in the flow subchannels adjacent the one flow subchannel.

With the objects of the invention in view, there is also provided a nuclear reactor fuel assembly of a boiling water reactor, comprising an elongated case having an interior, mutually parallel side walls laterally closing off the interior, an inlet end for a liquid coolant flow, and an outlet end for a liquid/steam mixture of the coolant; a grid extending substantially perpendicularly to the side walls of the case, the grid having mutually parallel first lengthwise ribs and mutually parallel second crosswise ribs meeting the first ribs at intersections, the ribs having lateral surfaces being parallel to each other and to the side walls of the case, the ribs having edges facing toward the coolant flow, and the ribs defining grid meshes therebetween; fuel rods containing nuclear fuel being disposed side by side and parallel to the side walls of the case, each of the fuel rods passing through a respective one of the grid meshes, and the fuel rods being disposed in lengthwise rows and in crosswise rows intersecting the lengthwise rows; each four of the fuel rods disposed in two adjacent lengthwise rows and in two adjacent crosswise rows forming one flow subchannel being parallel to the side walls of the case for conducting the coolant flow in a given direction, the flow subchannels defining a center axis and side walls of the flow subchannels; and two vanes being disposed at one of the intersections in each of at least a plurality of the flow subchannels, the two vanes being disposed on the edges of the first ribs facing away from the coolant flow at two sides of the second ribs, and the vanes being tapered in the given direction and being curved, for instance three-dimensionally curved or at least bent in order to form an angle with respect to the center axis in different directions for creating a swirl in the coolant around the center axis. In accordance with another feature of the invention, there are no controllable absorber elements disposed in the interior of the case.

In accordance with a further feature of the invention, there are provided two three-dimensionally curved further vanes tapering in the flow direction and being disposed on the edge of the second rib facing away from the coolant flow; one of the further vanes being disposed on each respective side of the first rib, and the further vanes being curved toward different meshes than the vanes on the first rib.

In accordance with an added feature of the invention, there is no intersection of one of the second ribs and one of the first ribs between an intersection of the first rib and the second rib and one of the further vanes.

With the objects of the invention in view, there is additionally provided a nuclear reactor fuel assembly, comprising an elongated case having an interior, mutually parallel side walls laterally closing off the interior, an inlet end for a liquid coolant flow, an outlet end for a liquid/steam mixture of the coolant; fuel rods containing nuclear fuel being disposed side by side and parallel to each other and to the side walls of the case, the fuel rods being disposed in lengthwise rows and in crosswise rows intersecting the lengthwise rows; a grid extending substantially perpendicularly to the side walls of the case, the grid having mutually parallel sheaths seated in spaces and forming meshes of the grid being penetrated by the fuel rods, the sheaths having ends facing away from the coolant flow; each four of the sheaths containing the fuel rods in two adjacent lengthwise rows and in two adjacent crosswise rows forming one flow subchannel being parallel to the side walls of the case for coolant flowing in a given direction, the flow subchannels defining a center axis and side walls of the flow subchannels; and one vane being disposed on each respective end facing away from the coolant flow of at least two of each four of the sheaths forming a flow subchannel, the vanes being diagonally opposite in the flow subchannel, being tapered in the given direction, and being inwardly curved (for instance bent or curved) three-dimensionally into the flow subchannel and rotationally symmetrical with respect to the center axis, for creating a swirl in the coolant around the center axis.

In accordance with a concomitant feature of the invention, the sheaths include main sheaths and additional sheaths parallel to the main sheaths in the flow subchannels, the additional sheaths have the ends facing away from the coolant flow, and the vanes are formed onto the ends of the additional sheaths facing away from the coolant flow.

The swirl generated by the vanes attached to the coolant outflow end of the grid in the cross section of the fuel assembly case spins the water droplets in the two-phase coolant mixture out of the flow subchannel in the direction of the outer surface of the fuel rods. There, even at an elevated output of the nuclear fuel assembly, they form a water film that prevents a dryout of the rods and an attendant poor heat transfer.

It is also seen that the film of water is formed on the outer surface of the fuel rods to an increased extent, in order to increase the allowable output of the nuclear fuel assembly. Other features which are considered as characteristic for the invention are set forth in the appended claims.

Although the invention is illustrated and described herein as embodied in a boiling water nuclear reactor and a nuclear reactor fuel assembly for the boiling water reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIGS. 6a, 6b and 7 are fragmentary plan views of a portion of two further embodiments of a gridlike spacer in a nuclear fuel assembly of FIG. 2 according to the invention;

FIG. 8 is a fragmentary, elevational view of a portion of the spacer of FIG. 7;

Figure 1:
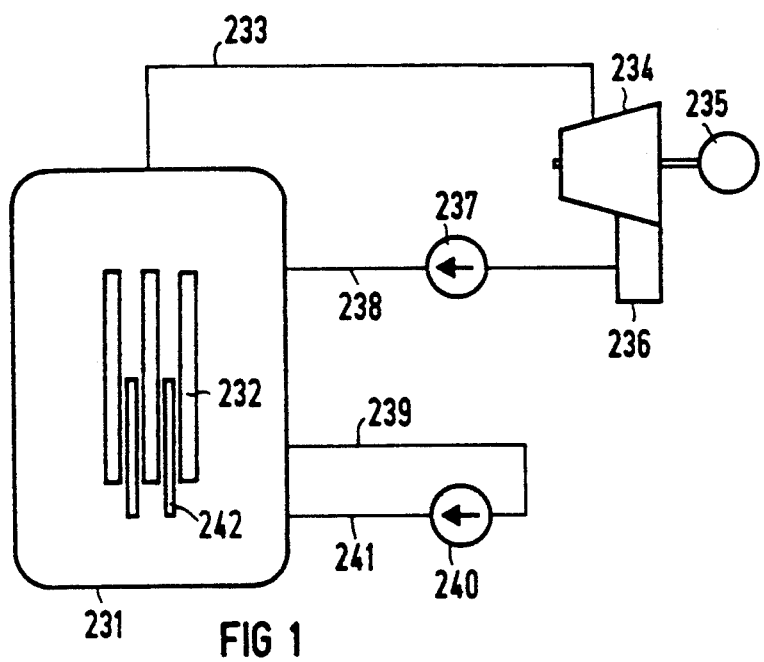
FIG. 1 is a schematic circuit diagram of a boiling water reactor.

Referring now to the figures of the drawing in detail and first, particularly, to FIG. 1 thereof, there is seen a boiling water reactor having a pressure vessel 231, in which a reactor core is disposed, that has vertically disposed nuclear reactor fuel assemblies 232, as shown in FIGS. 2-7, between which absorber assemblies 242 are disposed that are driven into a space between the fuel assemblies or retracted from the space in order to control the reactor. An outlet 233 for water vapor at the top of the pressure vessel 231 is connected to a steam turbine 234, which drives an electric generator 235. A condenser 236 associated with the steam turbine 234 is connected laterally through a feedwater pump 237 and a feedwater inlet 238 to the top of the pressure vessel 231. This feedwater pump 237 pumps condensed steam from the steam turbine 234 back into the pressure vessel 231 as feedwater.

In older boiling water reactors, the pressure vessel 231 also has a coolant outlet 239 below the feedwater inlet 238, laterally of the reactor core having the nuclear fuel assemblies 232. The pressure vessel 231 also has a coolant inlet 241 below the reactor core. A coolant pump 240 connected to the coolant outlet 239 and to the coolant inlet 241 pumps water continuously out of the pressure vessel 231, through the coolant outlet 239 and back into the pressure vessel 231 through the coolant inlet 241, thus assuring a continuous coolant flow through the reactor core and thus longitudinally through the nuclear fuel assemblies 232, beginning at the bottom of the pressure vessel 231. In modern reactors, this pump 240 is disposed in the interior of the pressure vessel.

Figure 2:
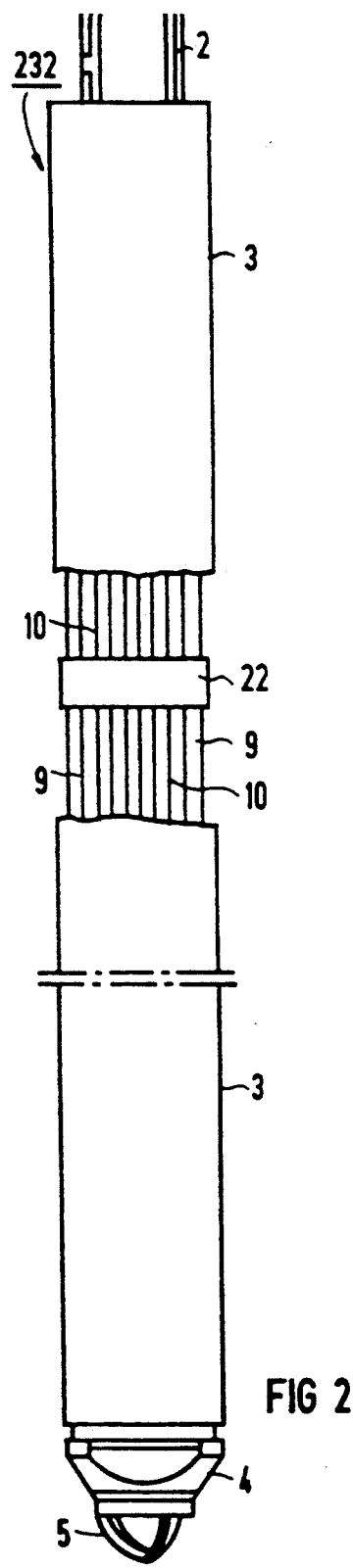
FIG. 2 is a fragmentary, diagrammatic, partly broken-away elevational view of a nuclear fuel assembly according to the invention, for a boiling water reactor of FIG. 1.

One of the fuel assemblies 232 of FIG. 2 for a boiling water reactor of FIG. 1, has a fuel assembly top, which is not identified by a reference numeral, with a handle 2 on top of a square grid plate. Two or four stay bolts, that are likewise not shown in the drawing, are located on top of this square grid plate. An elongated sheet-metal fuel assembly case, box or jacket 3 made of a zirconium alloy and associated with the fuel assembly rests on these stay bolts with two or four non-illustrated crosswise strips, that are also made of sheet metal that is made of a zirconium alloy, which are mounted on the inside of two or four corners of the upper end the fuel assembly case 3. Each crosswise strip is screwed to the applicable stay bolt. The fuel assembly case 3 is square in cross section and open on both ends. The grid plate itself is provided with a number of flow openings in the longitudinal direction of the fuel assembly 232, through which the coolant flows in the reactor core of the boiling water reactor. This grid plate is at right angles to the longitudinal direction of the fuel assembly 232. The side walls of the fuel assembly case 3 close off the fuel assembly at the sides.

The fuel assembly of FIG. 2 is also provided with a base 4, which also has a hidden and non-illustrated square grid plate. This square grid plate also has a number of coolant flow openings in the core of the boiling water reactor, extending longitudinally of the fuel assembly 232. The lower surface or underside of the grid plate of the fuel assembly base 4 is provided with a fitting device 5 that is open toward the grid plate and is inserted into a fitting opening on a so-called lower core grid plate located in the core of the boiling water reactor. On the upper end, the fuel assembly 232 is fixed in a mesh, opening or space of a so-called upper core grid.

The fuel assembly 232 of FIG. 2 also has a row of nuclear fuel-filled fuel rods, which are constructed as retaining rods 9, for the top part and bottom part 4 of the fuel assembly 232. These retaining rods 9 are screwed into the grid plate of the fuel assembly base 4 and reach through the grid plate of the fuel assembly top, where they are screwed to the grid plate with a nut located on the top of the grid plate.

Other fuel rods 10 filled with nuclear fuel are loosely inserted by their ends into openings in the grid plates of the top and the base 4 of the fuel assembly. Holding-down springs which are constructed as helical springs are mounted on their upper end. These springs are compression springs and each is supported at one end on the fuel rod 10 and at the other end on the lower surface or underside of the grid plate of the fuel assembly top.

Finally, the fuel assembly 232 of FIG. 2 has a plurality of square gridlike spacers between the fuel assembly top and the fuel assembly base. The spacers are located in a cross section of the fuel assembly case 3 and are aligned with the square grid plates of the top part and the base part 4. One gridlike spacer 22 can be seen in FIG. 2. The other gridlike spacers are constructed identically to the spacer 22 but are concealed both by the side walls of the fuel assembly case 3 and by the grid plate of the top part and the grid plate of the base part 4 and therefore cannot be seen.

Figure 3:
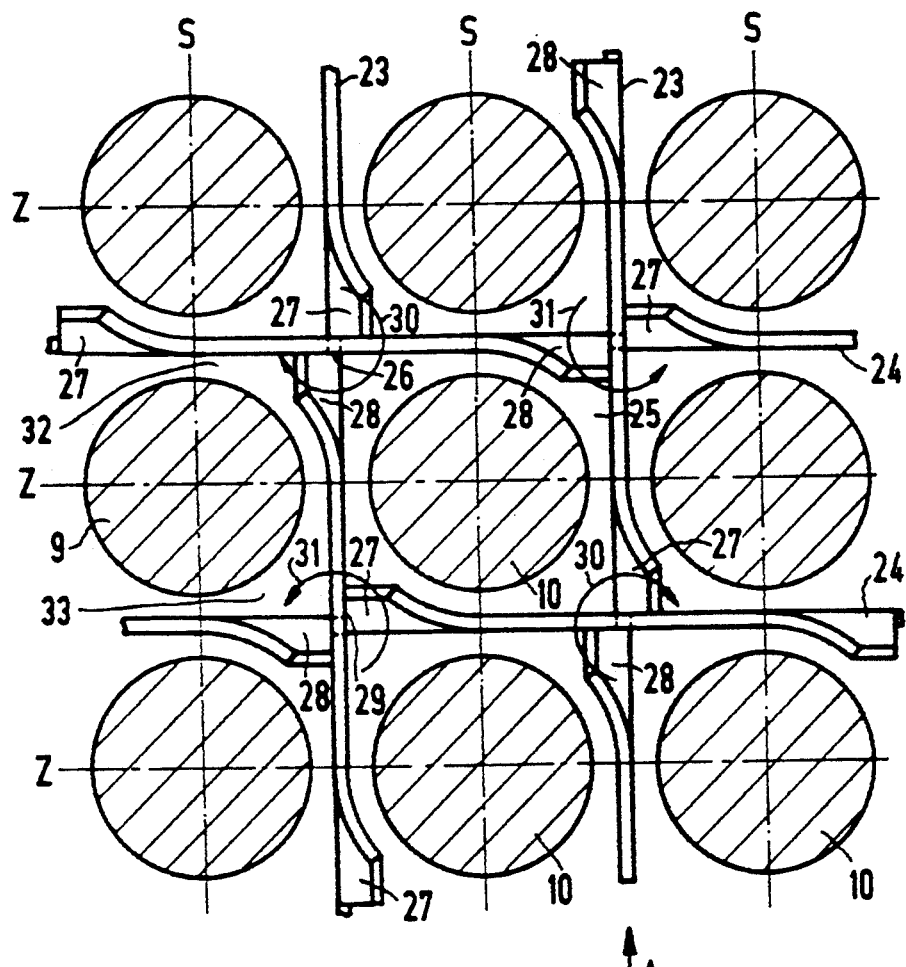
FIGS. 3 and 4 are respective fragmentary, plan and side-elevational views of a portion of a gridlike spacer in a nuclear fuel assembly of FIG. 2 according to the invention.

The plan view of FIG. 3 is a portion of FIG. 2 showing the coolant outflow end of a gridlike spacer 22, which is made of a nickel-chromium-iron alloy. This coolant outflow side faces toward the top of the fuel assembly 232. The gridlike spacer 22 has two groups of flat, planar ribs 23 and 24, which are located in a cross section of the fuel assembly case 3 and thus on a cross section of the fuel assembly 232. The ribs 23 ("crosswise ribs") of one group and the ribs 24 ("lengthwise ribs") of the other group penetrate one another at right angles. The spacing between two ribs 23 of one group is equal to the spacing between two ribs 24 of the other group. Correspondingly, the ribs 23 and 24 form square meshes 25 of equal area, which are located at points where equidistant lengthwise rows that are parallel to one another ("lines Z") intersect with equidistant crosswise rows ("columns S") that are parallel to one another. One retaining rod 9 or one fuel rod 10 is guided through each square mesh 25. Non-illustrated springs and knobs are located inside the meshes 25 at the ribs 23 and 24, assuring a positive holding connection of the retaining rod 9 or the fuel rod 10 to the gridlike spacers.

At an intersection 26 of one rib 23 and one rib 24, the rib 23 has a three-dimensionally curved vane or blade 27 or 28 on each respective side of the rib 24. Each vane tapers in the coolant flow direction. At an adjacent intersection 29, the rib 24 has one of these vanes 27 or 28 on each respective side of the rib 23. These vanes 27 and 28 increase gradually outwardly from the edge of the applicable rib facing toward the intersecting rib. The vanes mounted on the ribs 23 have a curvature about a direction parallel to these ribs 23, while the vanes mounted on the ribs 24 have a curvature about a direction parallel to the ribs 24. In order to form this curvature, two of the vanes 27 and 28 located at an intersection of the ribs 23 and 24 are three-dimensionally curved in different directions.

The rib 24, which has the two vanes 27 and 28 of the rib 23 on either side of it at the intersection 26, also has the two vanes 27 and 28 at the intersection 27, which are constructed identically to the other vanes 27 and 28. These vanes 27 and 28 at the rib 24 are curved toward different meshes 25 from those toward which the vanes 27 and 28 on the rib 23 at the intersection 26 are curved.

Figure 4:
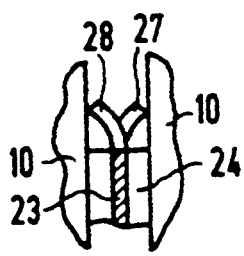

The arrow A indicates the direction in which the side view of a rib with the two vanes 27, 28 appears in FIG. 4.

The same is true for the rib 23 with respect to the intersection 29 next to the intersection 26.

The four retaining rods 9 or fuel rods 10 immediately surrounding one intersection 26 or 29 define flow subchannels or secondary channels 32, 33 having a center in which the intersection 26 or 29 is located.

In the flow subchannels at the intersections of the ribs 23 and 24, coolant flowing through the gridlike spacer shown in FIG. 3 at right angles to the plane of the drawing, from below that plane to above it, is made to swirl, as is represented by arrows 30 and 31, around the center of the flow subchannels. Although there is practically no net flow in the horizontal direction between the various flow subchannels, the two swirling flows of adjacent flow subchannels mix together somewhat at their boundary surfaces, which promotes temperature equalization and reinforces the swirl produced in the adjacent flow subchannel.

In the upper part of the fuel assembly, the coolant is in the form of a two-phase mixture of water and steam, and vanes attached there assure that the water is spun against the outer surfaces of the retaining rods 9 and the fuel rods 10, thus counteracting dryout.

Figure 5:
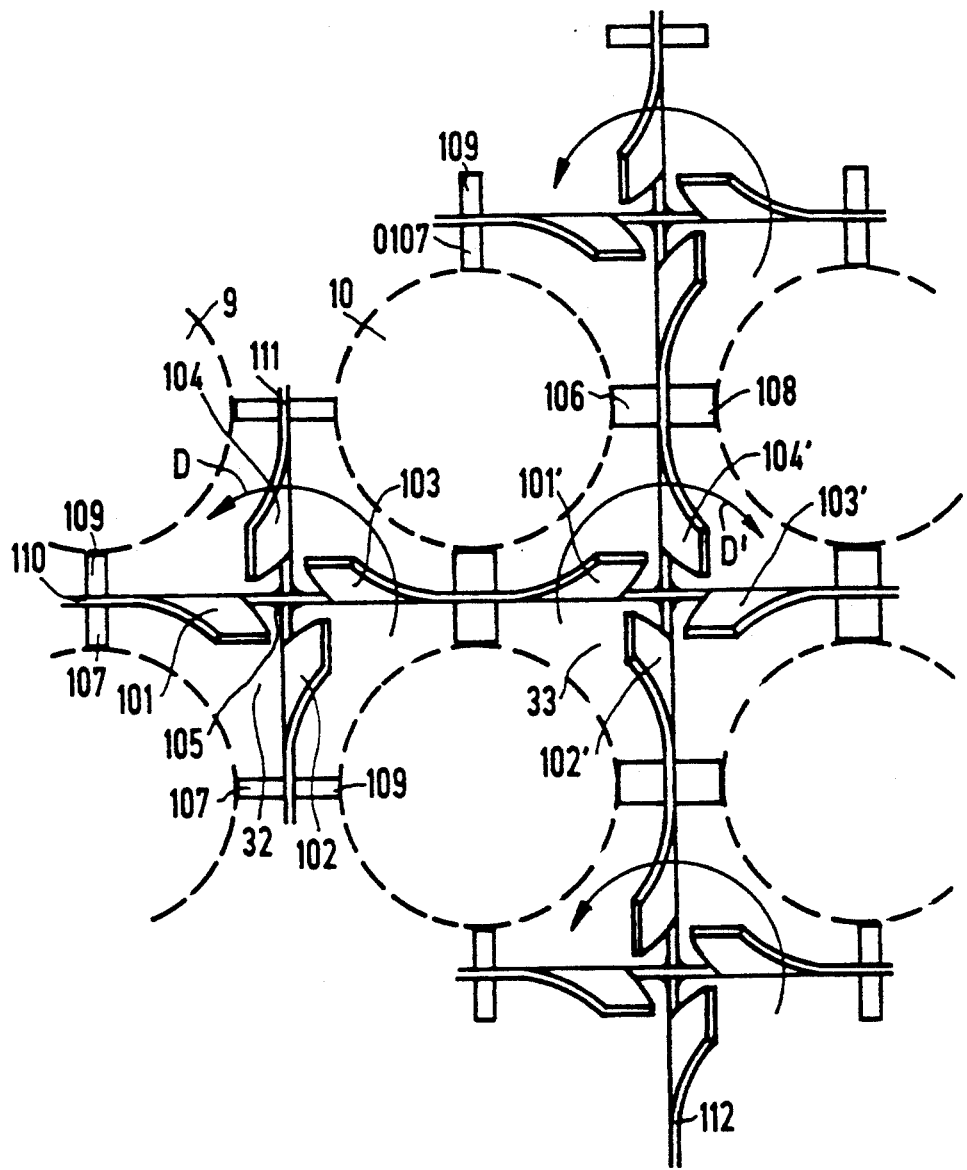
FIG. 5 is a fragmentary plan view of a different embodiment of the gridlike spacer.

In the spacer of FIG. 5, dashed lines represent the position of the fuel rods 9 and 10 that define flow subchannels 32 and 33. Four vanes 101, 102, 103, 104 and 101', 102', 103', 104' are respectively provided in each of these flow subchannels. The vanes 101 . . . 104 are disposed rotationally symmetrically about the center line of the flow channel 32, or in other words the line of intersection of a lengthwise rib 110 with a crosswise rib 111, where the two ribs are also joined together by spot welds 105.

Reference numerals 106 and 107 indicate knobs on the ribs, against which the fuel rods 9 and 10 are pressed by means of opposed springs 108, 109, in order to define the lateral spacing between the fuel rods.

On either side of the spot weld 105, the lengthwise rib 110 carries the vanes 101, 103, which are disposed and bent rotationally symmetrically in the direction of an arrow D, while in the adjacent flow subchannel 33, the crosswise rib 112 intersecting the lengthwise rib 110 includes corresponding vanes 102' and 104', but they are disposed and bent rotationally symmetrically in the opposite direction indicated by an arrow D'. The arrows D and D' therefore indicate the direction of rotation of the swirl in the subchannel.

The vanes 102, 104 and 101', 103', respectively, which are mounted in addition to those of FIG. 3, are subordinate to these rotational symmetries, which are each applicable to all of the vanes of one flow subchannel.

Figures 6A, 6B:
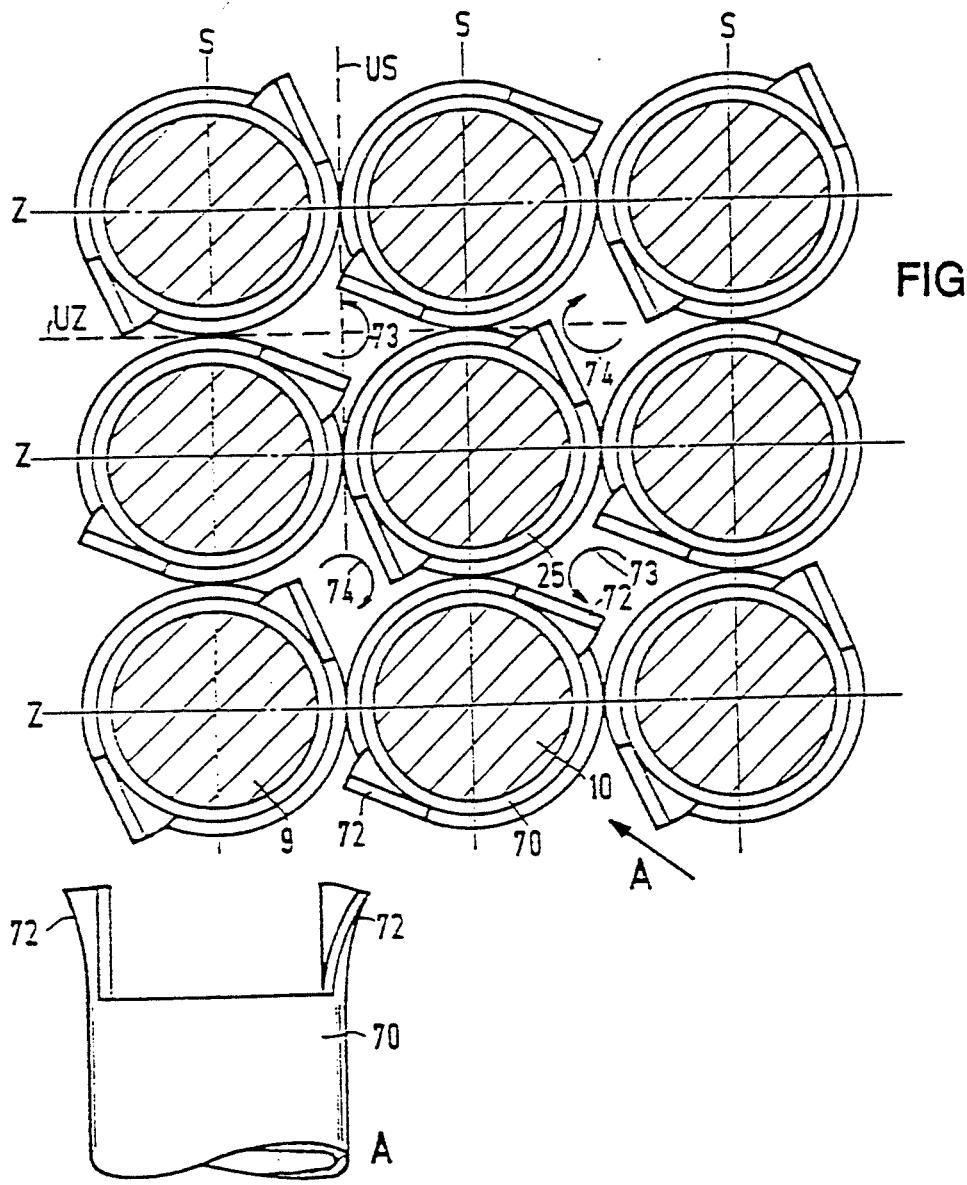

In the gridlike spacer of FIGS. 6a and 6b the meshes 25 for the retaining rods 9 and the fuel rods 10 are likewise located at intersections of parallel lengthwise rows Z and parallel crosswise rows S that are orthogonal to those lines. The lengthwise rows Z are equidistant from one another, as are the crosswise rows S. The spacing between two crosswise rows is also equal to the spacing between two lengthwise rows.

The meshes 25 are formed by hollow-cylindrical sheaths 70 of equal height, which have the same inside and outside cross section. Non-illustrated contact springs and contact knobs for a retaining rod 9 or a fuel rod 10 are located in the sheaths 70. The center of the inside cross section of each sheath 70 is disposed at an intersection of one line Z and one column S. One end of all of the sheaths 70 is located in a cross-sectional plane of the fuel assembly case 3, and the other end of all of the sheaths is located in a cross-sectional plane parallel to that cross-section plane. Adjacent sheaths touch one another along a jacket or mantel line, at which they are welded to one another.

Each respective group of four sheaths 70, disposed at the intersections of two adjacent lines Z and two adjacent columns S, form a flow subchannel parallel to these sheaths 70, which is located in the center between these four sheaths 70. Two vanes 72 that are disposed opposite each other along a sheath diameter, are formed at an end of these sheaths 70 facing away from the coolant flow. For each sheath 70, the two vanes 72 are rotationally symmetrical with respect to a longitudinal sheath axis in the center of the sheath. The vanes taper in the coolant outflow direction. The vanes are also each curved three-dimensionally inward, forming a bulge, into one respective flow subchannel. The vanes 72 of the sheaths 70 touching one another are also oppositely rotationally symmetrical with respect to the longitudinal axis in the center of the applicable sheath 70.

Two vanes 72 protrude into each flow subchannel and are rotationally symmetrical with respect to a central axis of this flow subchannel that is parallel to the sheaths 70.

In this way, in one flow subchannel, the vanes 72 are oppositely rotationally symmetrical to the vanes in every other flow subchannel. Adjacent flow subchannels are located alternatingly, so that one is on an intermediate line UZ parallel to the lines Z and the next is on an intermediate column US parallel to the columns S, and so forth.

A coolant flowing from below the plane of the drawing in FIG. 6 to above it, orthogonally to the plane of the drawing, is accordingly provided with a swirl, which is symbolized by respective arrows 73 and 74, in the flow subchannels. Each swirl in one subchannel has a reinforcing effect on the swirl in an adjacent subchannel, and water droplets contained in the coolant are spun outward against the outer surface of the retaining rods 9 or fuel rods 10, as in the case of the gridlike spacer of FIG. 3.

The more vanes a subchannel has, and the more its cross section decreases, and the more the pressure loss in the vertical flow increases, yet it is still advantageous to provide four vanes 72, 75, 76, 77 in each flow conduit, having a rotationally symmetrical configuration and shape that produces a spacer as shown in FIG. 7.

Once again, the arrow A indicates a view toward a sheath 70 shown in FIG. 8. It can also be seen that by providing indentations 78 in the sheaths, knobs are formed, against which the fuel rods 9, 10 are pressed by springs 79 that engage two adjacent sheaths.

An outer rib 80 has contact knobs 81 that rest on side walls 82 of the fuel assembly case, it runs along an outer edge of the spacer and it has tabs 83. Like the vanes in the flow subchannels, the tabs 83 are located on the side of the spacer facing away from the flow, they taper in the flow direction, and are inclined relative to the case wall.

Reference numeral 84 indicates the wall of a water tube, which in this case occupies the cross section of 3×3 grid meshes and is seated in the center of the fuel assembly. An inner rib 85 with corresponding tabs 86 defines the spacer relative to the water tube 84.

Figure 9:
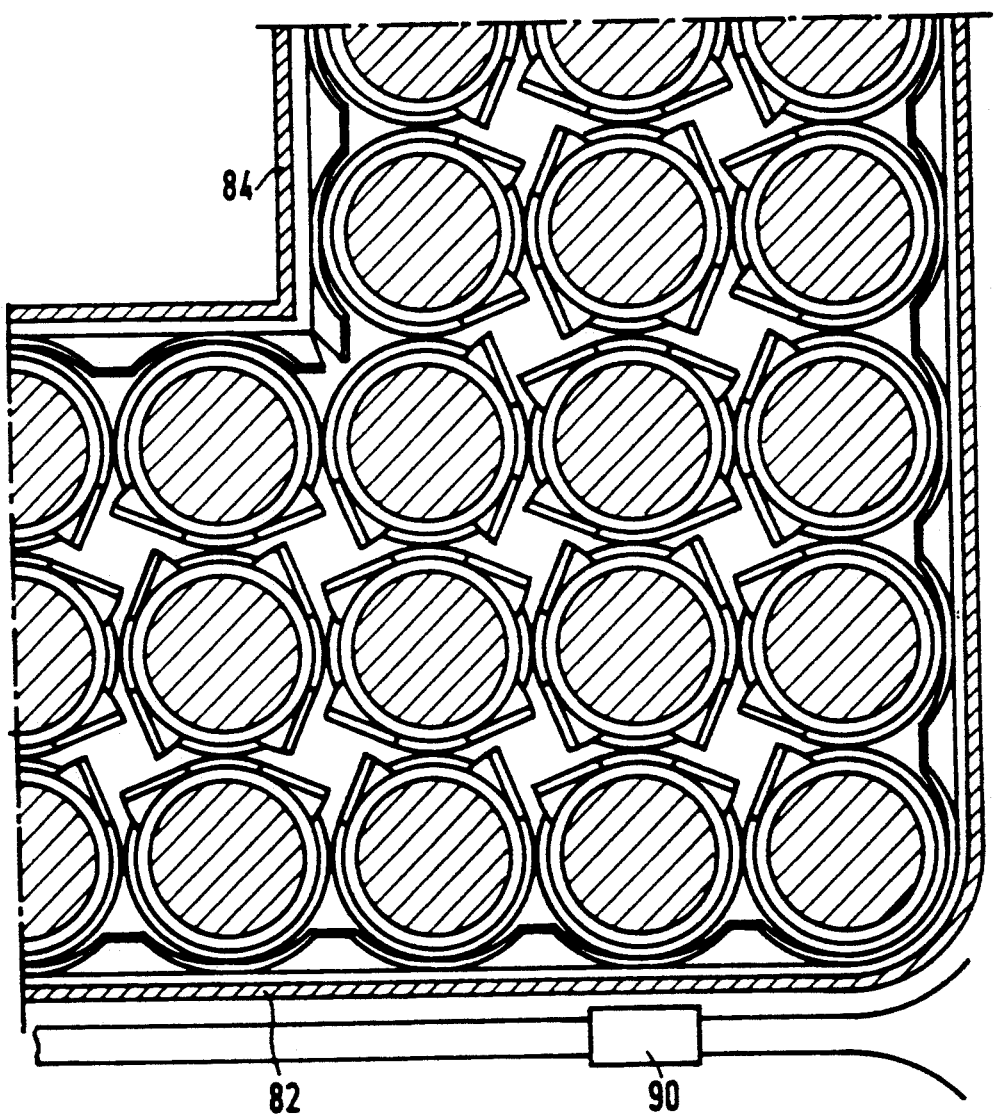
FIG. 9 is a fragmentary, cross-sectional view of a fuel assembly.

FIG. 9 shows a cross section of a portion of a corresponding structure, which is disposed between the water tube 84 and the fuel assembly case having the side wall 82 and serves initially only as a support for the vanes in the flow subchannels. It is therefore initially a mixing grid, but by using suitable spring and knob combinations it can be expanded at any time to make a spacer.

A controllable absorber element is indicated at reference numeral 90. Such absorber elements are only located outside the fuel assembly case and are therefore protected by the case walls from any possible horizontal flows of liquid/steam mixture.

Figure 11:
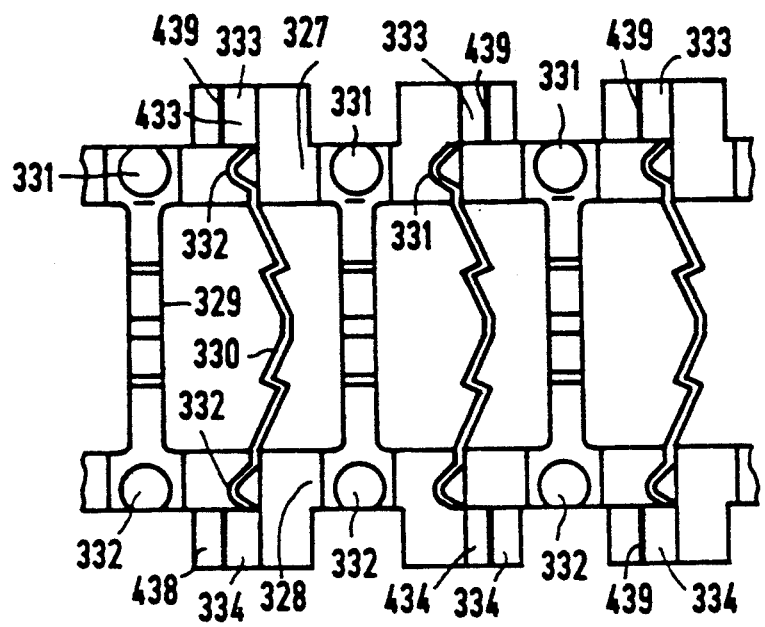
FIG. 11 is a fragmentary, longitudinal-sectional view taken along the line XI—XI of FIG. 10, in the direction of the arrows.
Figure 10:
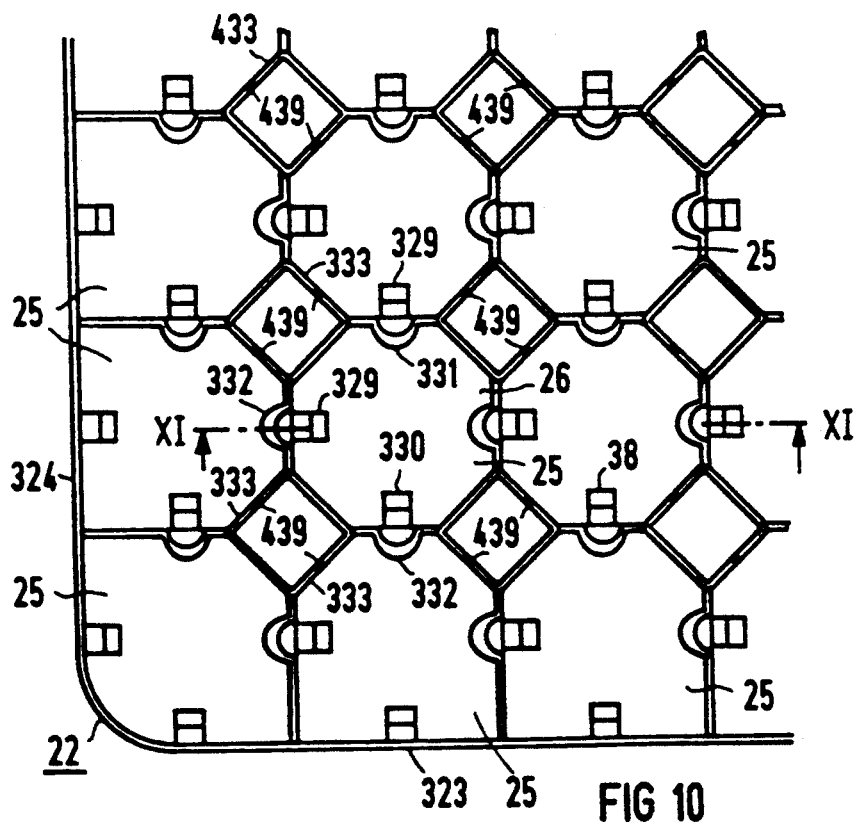
FIG. 10 is a fragmentary, cross-sectional view of a portion of another spacer of the invention.
Figure 12:
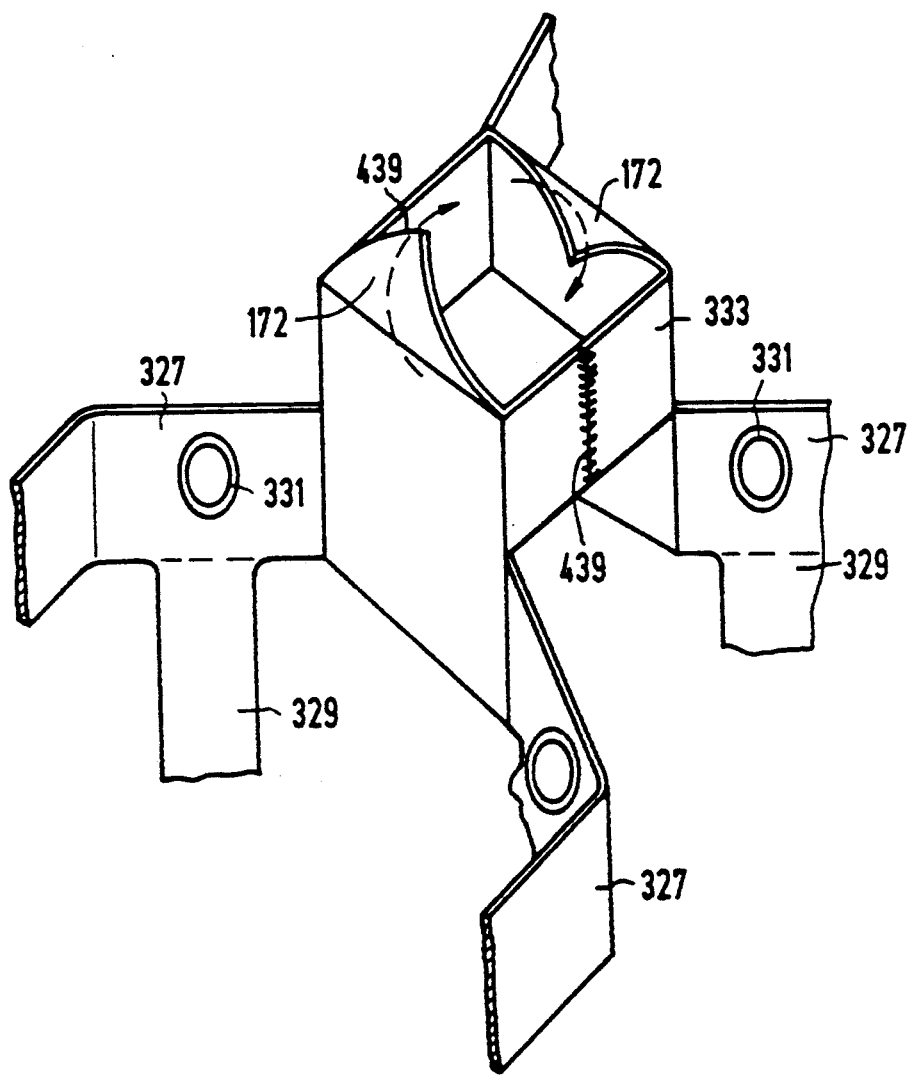
FIG. 12 is a fragmentary, perspective view of a portion of the gridlike spacer of FIGS. 5 and 6.

The spacer of FIGS. 10-12 is square and is likewise made of a nickel-chromium-iron alloy. Two flat, planar outer ribs 323 and 324 can be seen, which are disposed on edge and at right angles to one another and form a rounded portion at the corners of the spacer 22. The spacer 22 also has grid meshes 25, which are located like the squares of a checkerboard at positions disposed in dense lines and in columns at right angles to the lines. One non-illustrated nuclear-fuel-containing retaining rod or fuel rod of the fuel assembly 232 reaches through each of the grid meshes 25. The outer ribs 323 and 324 are at right angles to this fuel assembly, and these outer ribs 323 and 324 face flat toward it.

Inside the outer ribs 323 and 324 of the spacer 22 are pairs of mutually aligned main sheaths 327 and 328, which have longitudinal axes that are parallel to one another and to the fuel rods in the spacer 22, like the squares of the same color in a checkerboard at the positions of the grid meshes 25, in lines and in columns at right angles to the lines, in each case leaving one intermediate position open between two occupied positions.

The main sheaths 327 and 328 of all of the pairs of main sheaths of the spacer 22 have a cross section with a congruent outer contour, which is a regular octagon. On two sides of this octagon, which are parallel to the same outer rib 323 or 324, the main sheaths 327 and 328 are provided with connecting ribs 329 and 330, which extend over a direction that is parallel to the longitudinal axes of the pairs of the main sheath 327 and 328. At the main sheaths 327 and 328, these connecting ribs 329 and 330 are each formed on to the middle of the side of the regular octagon forming the outer contour of the cross section, and their width equals approximately one-third the length of the side of this rectangular octagon. Two connecting ribs 329 and 330 seated on parallel sides of this octagon are each curved in the same direction in the middle. In other words, one connecting rib 329 is curved outward with respect to the main sheath 327 and 328, and one connecting rib 330 is curved inward with respect to the main sheath 327 and 328. In the middle of the sides of the outer contour of their cross section forming a rectangular octagon, the main sheaths 327 and 328 also have respective rigid knobs 331 and 332 on the applicable main sheath wall. The rigid knob 331 faces inward, if the connecting rib 329 faces outward on the side of the outer contour with respect to the main sheath 327 or 328, and the rigid knob 332 faces outward with respect to the main sheaths 327 or 328 if the connecting rib 330 faces inward with respect to this main sheath 327 or 328.

In the spacer, pairs of additional or spacer sheaths 333 and 334, which are aligned with one another, are disposed in the diagonal direction between the main sheaths 327 and 328 and have a cross section that is smaller than the cross section of the main sheaths 327 and 328. The spacer sheaths have a square outer contour, with a length on a side that is equal to the length of the side of the outer contour of the cross section of the main sheaths 327 and 328, forming a regular octagon. These spacer sheaths 333 and 334 are located between the respective main sheaths 327 and 328 and are each formed by two respective spacer sheath parts 433 and 434, each of which is formed on the outer edge of one main sheath 327 or 328, on the side of the outer contour between two sides with the connecting ribs 329 and 330 and the knobs 331 and 332, respectively. Each spacer sheath part 433 and 434 is half of one spacer sheath 333 or 334 of two adjacent main sheaths 327 and 328, respectively. These half spacer sheaths 333 are welded to one another at welding points or locations 439 and 440. The main sheaths 327, together with the spacer sheaths 333 formed onto them, form a first partial grid of the spacer 22, and the main sheaths 328, together with the spacer sheaths 334 welded onto them, form a second partial grid, parallel to the first partial grid. Each of the spacer sheaths 333 and 334 are seated on the outside of these partial grids and form additional sheaths in the flow subchannel that is formed in the respective center between four retaining rods 9 or fuel rods 10. These four retaining rods 9 or fuel rods 10 are each located in meshes 26 of the gridlike spacer, in two adjacent lines and two adjacent columns.

As is shown only in FIG. 12 for the sake of clarity, one spacer sheath 333 on the coolant outflow side of the gridlike spacer of FIGS. 4 and 5 has two vanes 172 that curve three-dimensionally inward into the flow subchannel and taper toward one another in the coolant outflow direction. These vanes 172 are located on two opposed coolant outflow edges that are parallel to one another and thus at the coolant outflow ends of the main sheath 327. These vanes are rotationally symmetrical to a central axis of the flow subchannel extending through the intersection points of the diagonals of the cross sections of the spacer sheaths 333.

Vanes on spacer sheaths that are immediately adjacent to sides of the main sheaths 327, in sublines and subcolumns defined by these sides in the spacer sheaths 333 shown in FIG. 6, carry vanes on the coolant outflow edges that in contrast are rotationally symmetrical to the vanes on the spacer sheath 333 of FIG. 11.

Once again, it is advantageous to supplement each of the pairs of vanes shown in one flow subchannel with a further pair of vanes, that are adapted to the rotational direction in the applicable flow subchannel. The disadvantages entailed by the resultant increased flow resistance can be more than compensated for by the advantages of making the liquid/steam mixture turbulent.

We claim:

1. A boiling water reactor, comprising:
   a pressure vessel, a steam turbine connected to said pressure vessel, a reactor core disposed in said pressure vessel, at least one nuclear reactor fuel assembly disposed in said reactor core, and controllable absorber elements disposed in said reactor core outside said at least one fuel assembly;
   said at least one fuel assembly including an elongated fuel assembly case with mutually parallel side walls laterally closing off said fuel assembly, an inlet end for liquid coolant, an outlet end for a liquid/steam mixture of the coolant, fuel rods containing nuclear fuel being disposed side by side and parallel to said side walls of said case, and a grid extending substantially perpendicularly to said side walls of said case, said grid having grid meshes formed therein through which said fuel rods extend;
   said fuel rods being disposed in lengthwise rows and in crosswise rows intersecting said lengthwise rows, and each four of said fuel rods disposed in two adjacent lengthwise rows and in two adjacent crosswise rows forming one flow subchannel being parallel to said side walls of said case for coolant flowing in a given direction, said flow subchannels defining a center axis and side walls of said flow subchannels;
   said grid being formed of ribs extending substantially parallel to said lengthwise rows and said crosswise rows and having edges facing away from the coolant flow, and at least two vanes disposed on said edges of said ribs in a center region of at least a plurality of said flow subchannels, said vanes being tapered in said given direction and curved at an angle with respect to the center axis for creating a swirl in the coolant around the center axis.

2. The boiling water reactor according to claim 1, wherein said at least two vanes are four vanes disposed in each of said plurality of flow subchannels, said four vanes being substantially rotationally symmetrical about the center axis.

3. The boiling water reactor according to claim 1, wherein said ribs have retaining elements fixing a spacing between said fuel rods and said side walls of said case.

4. The boiling water reactor according to claim 1, wherein all of said vanes are disposed and formed substantially rotationally symmetrically in one direction about the center axis in one of said flow subchannels, and all of said vanes axis in one of said flow subchannels, and all of said vanes are disposed and formed substantially rotationally symmetrically in an opposite direction in said flow subchannels adjacent said one flow subchannel.

5. A nuclear reactor fuel assembly of a boiling water reactor, comprising:
an elongated case having an interior, mutually parallel side walls laterally closing off the interior, an inlet end for a liquid coolant flow, and an outlet end for a liquid/steam mixture of the coolant;
a grid extending substantially perpendicularly to said side walls of said case, said grid having mutually parallel first lengthwise ribs and mutually parallel second crosswise ribs meeting said first ribs at intersections, said ribs having lateral surfaces being parallel to each other and to said side walls of said case, said ribs having edges facing toward the coolant flow, and said ribs defining grid meshes therebetween;
fuel rods containing nuclear fuel being disposed side by side and parallel to said side walls of said case, each of said fuel rods passing through a respective one of said grid meshes, and said fuel rods being disposed in lengthwise rows and in crosswise rows intersecting said lengthwise rows;
each four of said fuel rods disposed in two adjacent lengthwise rows and in two adjacent crosswise rows forming one flow subchannel being parallel to said side walls of said case for conducting the coolant flow in a given direction, said flow subchannels defining a center axis and side walls of said flow subchannels; and
two vanes being disposed at one of said intersections in each of at least a plurality of said flow subchannels, said two vanes being disposed on said edges of said first ribs facing away from the coolant flow at two sides of said second ribs, and said vanes being tapered in said given direction and curved with an angle with respect to the center axis in different directions for creating a swirl in the coolant around the center axis.

6. The nuclear reactor fuel assembly according to claim 5, wherein no controllable absorber elements are disposed in the interior of said case.

7. The nuclear reactor fuel assembly according to claim 5, including two three-dimensionally curved further vanes tapering in the flow direction and being disposed on said edge of said second rib facing away from the coolant flow; one of said further vanes being disposed on each respective side of said first rib, and said further vanes being curved toward different meshes than said vanes on said first rib.

8. The nuclear reactor fuel assembly according to claim 7, wherein there is no intersection of one of said second ribs and one of said first ribs between an intersection of said first rib and said second rib and one of said further vanes.

9. A nuclear reactor fuel assembly, comprising:
an elongated case having an interior, mutually parallel side walls laterally closing off the interior, an inlet end for a liquid coolant flow, an outlet end for a liquid/steam mixture of the coolant;
fuel rods containing nuclear fuel being disposed side by side and parallel to each other and to said side walls of said case, said fuel rods being disposed in lengthwise rows and in crosswise rows intersecting said lengthwise rows;
a grid extending substantially perpendicularly to said side walls of said case, said grid having mutually parallel sheaths forming meshes of said grid being penetrated by said fuel rods, said sheaths having ends facing away from the coolant flow;
flow subchannels defining a center axis and side walls of said flow subchannels; and
one vane being disposed on each respective end facing away from the coolant flow of at least two of each four of said sheaths forming a flow subchannel, said vanes being diagonally opposite in said flow subchannel, being tapered in said given direction and being inwardly curved into said flow subchannel with an angle and rotationally symmetrical with respect to the center axis, for creating a swirl in the coolant around the center axis.

10. The nuclear reactor fuel assembly according to claim 9, wherein said sheaths include main sheaths and additional sheaths parallel to said main sheaths in said flow subchannels, said additional sheaths have said ends facing away from the coolant flow, and said vanes are formed onto said ends of said additional sheaths facing away from the coolant flow.

11. The nuclear reactor fuel assembly according to claim 5, wherein said vanes are three-dimensionally inwardly curved with respect to said center axle.

12. The nuclear reactor fuel assembly according to claim 9, wherein said vanes are three-dimensionally inwardly curved with respect to said center axle.

13. The boiling water reactor of claim 1, wherein said vanes are three-dimensionally invertly curved with respect to said center axis.

* * * * *

(12) EX PARTE REEXAMINATION CERTIFICATE (6159th)
United States Patent
Kraemer et al.

(10) Number: US 5,327,472 C1
(45) Certificate Issued: Mar. 25, 2008

(54) BOILING WATER NUCLEAR REACTOR AND NUCLEAR REACTOR FUEL ASSEMBLY FOR THE BOILING WATER REACTOR

(75) Inventors: Wendelin Kraemer, Frankfurt am Main (DE); Walter Uebelhack, Erlangen (DE); Gustav Frömel, Erlangen (DE)

(73) Assignee: Areva NP GmbH, Erlangen (DE)

Reexamination Request:
No. 90/007,163, Aug. 6, 2004

Reexamination Certificate for:
Patent No.: 5,327,472
Issued: Jul. 5, 1994
Appl. No.: 07/924,059
Filed: Aug. 28, 1992

(22) PCT Filed: Feb. 20, 1991
(86) PCT No.: PCT/DE91/00133
§ 371 (c)(1),
(2), (4) Date: Sep. 29, 1992
(87) PCT Pub. No.: WO91/13442
PCT Pub. Date: Sep. 5, 1991

(30) Foreign Application Priority Data
Feb. 28, 1990 (DE) .............................. 4006264

(51) Int. Cl.
*G21C 3/32* (2006.01)
*G21C 3/322* (2006.01)

(52) U.S. Cl. ........................................ 376/439; 376/441
(58) Field of Classification Search ................. 376/439, 376/441, 443, 438
See application file for complete search history.

(56) References Cited

U.S. PATENT DOCUMENTS

| 4,698,204 A | * | 10/1987 | Taleyarkhan ................. 376/439 |
| 4,756,878 A | * | 7/1988 | King et al. .................. 376/439 |
| 4,770,843 A | * | 9/1988 | Taleyarkhan ................. 376/216 |
| 4,913,875 A | * | 4/1990 | Johansson et al. .......... 376/439 |
| 5,069,864 A | * | 12/1991 | Johansson ................... 378/441 |

FOREIGN PATENT DOCUMENTS

| EP | 0260602 B1 | 9/1987 | |
| EP | 0308701 B1 | 9/1988 | |
| JP | 54-076497 | * 5/1979 | ................ 376/439 |

* cited by examiner

*Primary Examiner*—Peter C. English

(57) ABSTRACT

A boiling water reactor includes fuel assemblies having a case containing fuel rods which are parallel to walls of the case. Flow subchannels are formed by each four of the fuel rods. At least two and preferably four vanes in the flow subchannels are tapered in a vertical coolant flow direction and are three-dimensionally curved in such a way as to generate a swirl in the coolant flow. It is therefore possible to obtain a relatively high output from the fuel assembly.

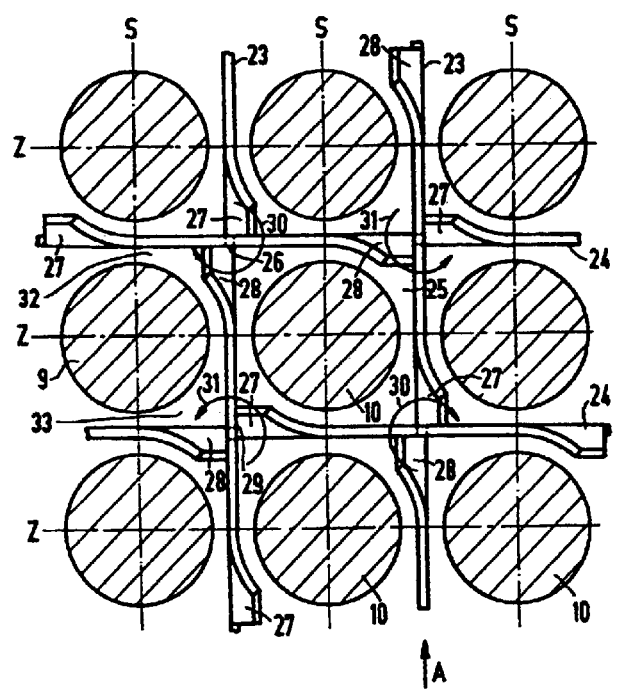

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 5, 7 and 9 are determined to be patentable as amended.

Claims 2–4, 6, 8 and 10–13, dependent on an amended claim, are determined to be patentable.

1. A boiling water reactor, comprising:
a pressure vessel, a steam turbine connected to said pressure vessel, a reactor core disposed in said pressure vessel, at least one nuclear reactor fuel assembly disposed in said reactor core, and controllable absorber elements disposed in said reactor core outside said at least one fuel assembly;
said at least one fuel assembly including an elongated fuel assembly case with mutually parallel side walls laterally closing off said fuel assembly, an inlet end for liquid coolant, an outlet end for a liquid/steam mixture of the coolant, fuel rods containing nuclear fuel being disposed side by side and parallel to said side walls of said case, and a grid extending substantially perpendicularly to said side walls of said case, said grid having grid meshes formed therein through which said fuel rods extend;
said fuel rods being disposed in lengthwise rows and in crosswise rows intersecting said lengthwise rows, and each four of said fuel rods disposed in two adjacent lengthwise rows and in two adjacent crosswise rows forming one flow subchannel being parallel to said side walls of said case for coolant flowing in a given direction, said flow subchannels defining a center axis and side walls of said flow subchannels;
said grid being formed of ribs extending substantially parallel to said lengthwise rows and said crosswise rows and having *upper* edges facing [away from] *in the direction of* the coolant flow, and at least two vanes disposed on said edges of said ribs in a center region of at least a plurality of said flow subchannels, said vanes [being tapered in said given direction] *having side edges projecting away from said upper edges and being tapered in a direction extending away from said upper edges* and *said vanes being* curved at an angle with respect to the center axis *in mutually different directions* for creating a swirl in the coolant around the center axis.

5. A nuclear reactor fuel assembly of a boiling water reactor, comprising:
an elongated case having an interior, mutually parallel side walls laterally closing off the interior, an inlet end for a liquid coolant flow, and an outlet end for a liquid/steam mixture of the coolant;
a grid extending substantially perpendicularly to said side walls of said case, said grid having mutually parallel first lengthwise ribs and mutually parallel second crosswise ribs meeting said first ribs at intersections, said ribs having lateral surfaces being parallel to each other and to said side walls of said case, said ribs having *upper* edges facing [toward] *in the direction of* the coolant flow, and said ribs defining grid meshes therebetween;
fuel rods containing nuclear fuel being disposed side by side and parallel to said side walls of said case, each of said fuel rods passing through a respective one of said grid meshes, and said fuel rods being disposed in lengthwise rows and in crosswise rows intersecting said lengthwise rows;
each four of said fuel rods disposed in two adjacent lengthwise rows and in two adjacent crosswise rows forming one flow subchannel being parallel to said side walls of said case for conducting the coolant flow in a given direction, said flow subchannels defining a center axis and side walls of said flow subchannels; and
two vanes being disposed at one of said intersections in each of at least a plurality of said flow subchannels, said two vanes being disposed on said *upper* edges of said first ribs facing [away from] *in the direction of* the coolant flow at two sides of said second ribs, [and said vanes being tapered in said given direction] *said vanes having side edges projecting away from said upper edges and being tapered in a direction extending away from said upper edges* and *said vanes being* curved with an angle with respect to the center axis in different directions for creating a swirl in the coolant around the center axis.

7. The nuclear reactor fuel assembly according to claim 5, including two three-dimensionally curved further vanes tapering in the flow direction and being disposed on said edge of said second rib facing [away from] *in the direction of* the coolant flow; one of said further vanes being disposed on each respective side of said first rib, and said further vanes being curved toward different meshes than said vanes on said first rib.

9. A nuclear reactor fuel assembly, comprising:
an elongated case having an interior, mutually parallel side walls laterally closing off the interior, an inlet end for a liquid coolant flow, an outlet end for a liquid/steam mixture of the coolant;
fuel rods containing nuclear fuel being disposed side by side and parallel to each other and to said side walls of said case, said fuel rods being disposed in lengthwise rows and in crosswise rows intersecting said lengthwise rows;
a grid extending substantially perpendicularly to said side walls of said case, said grid having mutually parallel sheaths forming meshes of said grid being penetrated by said fuel rods, said sheaths having ends facing [away from] *in the direction of* the coolant flow;
*respective groups of four sheaths together forming* flow subchannels defining a center axis *in a center of said four sheaths* and side walls of said flow subchannels; and
one vane being disposed on each respective end facing [away from] *in the direction of* the coolant flow of at least two of each four of said sheaths forming a flow subchannel, said vanes being diagonally opposite in said flow subchannel, [being tapered in said given direction] *having side edges projecting away from said ends facing in the direction of the coolant flow and being tapered in a direction extending away from said*

*ends of said sheaths,* and being inwardly curved into said flow subchannel with an angle and rotationally symmetrical with respect to the center axis, for creating a swirl in the coolant around the center axis.

* * * * *